United States Patent [19]

Herrick et al.

[11] Patent Number: 5,521,970
[45] Date of Patent: May 28, 1996

[54] ARRANGEMENT FOR EXTENDING CALL-COVERAGE ACROSS A NETWORK OF NODES

[75] Inventors: Donna W. Herrick, Thornton; Rickie E. Meis, Arvada, both of Colo.

[73] Assignee: AT&T Corp., Murray Hill, N.J.

[21] Appl. No.: 413,141

[22] Filed: Mar. 29, 1995

[51] Int. Cl.$^6$ .................................................. H04M 3/54
[52] U.S. Cl. ........................ 379/201; 379/211; 379/221; 379/225; 379/198
[58] Field of Search ................................. 379/201, 211, 379/212, 210, 221, 225, 231, 232, 271, 207, 220, 196, 198, 230

[56] References Cited

U.S. PATENT DOCUMENTS

| | | | |
|---|---|---|---|
| 4,150,257 | 4/1979 | Fenton et al. | 379/211 |
| 4,313,036 | 1/1982 | Jabara et al. | 379/207 |
| 4,436,962 | 3/1984 | Davis et al. | 379/211 |
| 4,436,963 | 3/1984 | Cottrell et al. | 379/211 |
| 4,488,004 | 12/1984 | Bogart et al. | 379/225 |
| 5,062,103 | 10/1991 | Davidson et al. | 370/58.1 |
| 5,206,901 | 4/1993 | Harlow et al. | 379/211 |
| 5,237,604 | 8/1993 | Ryan | 379/220 |
| 5,247,571 | 9/1993 | Kay et al. | 379/207 |
| 5,282,244 | 1/1994 | Fuller et al. | 379/221 |
| 5,311,585 | 5/1994 | Armstrong et al. | 379/221 |
| 5,313,459 | 5/1994 | Matern | 370/58.1 |
| 5,329,578 | 7/1994 | Brennan et al. | 379/201 |
| 5,329,581 | 7/1994 | Friedes et al. | 379/201 |
| 5,335,268 | 8/1994 | Kelly, Jr. et al. | 379/221 |
| 5,353,339 | 10/1994 | Scobee | 379/221 |
| 5,369,695 | 11/1994 | Chakravarti et al. | 379/211 |
| 5,377,262 | 12/1994 | Bales et al. | 379/221 |
| 5,390,242 | 2/1995 | Bales et al. | 379/221 |
| 5,404,350 | 4/1995 | DeVito et al. | 379/221 |
| 5,450,482 | 9/1995 | Chen et al. | 379/221 |
| 5,455,855 | 10/1995 | Hokari | 379/211 |
| 5,459,779 | 10/1995 | Backaus et al. | 379/201 |

OTHER PUBLICATIONS

Excerpts from "Based on Definity$^R$ Generic 2.1, Issue 3.1 Health, Education and Safety Package, Feature Package PG-3W104", AT&T Specification No. SD 6213, May 4, 1992, pp. 11–13; 19–21; 26–27.
"G3V2 Feature Description", AT&T document No. 555-230-204, Issue 1, Jul. 1993, pp. 3-301-3-314.
"G3V2 Implementation", AT&T document No. 555-230-653, Issue 1, Jul. 1993, pp. 3-113-3-118.
"G3V2 Implementation", AT&T document No. 555-230-653, Issue 1, Jul. 1993, pp. 3-169-3-172.
"G3V3 Implementation", AT&T document No. 555-230-653B, Issue 2, Mar. 1994, pp. 413–416.
"G3V3 Implementation" AT&T document No. 555-230-653, Issue 1, Jul. 1993, (Addendum to AT&T 555-230-653), pp. 5-251-5-252; 3-432a-3-432d.

*Primary Examiner*—Jeffery Hofsass
*Assistant Examiner*—Scott Wolinsky
*Attorney, Agent, or Firm*—David Volejnicek

[57] ABSTRACT

In a network of telecommunication switches, a first switch redirects a to-be-covered call to a remote call-covering endpoint served by a second switch, without losing control over the call. The first switch accompanies connection of the call to the second switch with signaling that identifies the call as a coverage call. The second switch responds to the signaling by determining the available status of the remote covering endpoint and signaling the status back to the first switch. If the remote covering endpoint is available, the second switch takes steps to connect the call to the endpoint. If the remote covering endpoint is not available, the first switch disconnects the call from the second switch and proceeds to cover the call to an alternative covering endpoint. The net effect is that call coverage works—from a user viewpoint—identically across a network of switches as it does on a single switch.

33 Claims, 6 Drawing Sheets

5,521,970

ARRANGEMENT FOR EXTENDING CALL-COVERAGE ACROSS A NETWORK OF NODES

TECHNICAL FIELD

This invention relates generally to telecommunications, and relates specifically to user features in telecommunications networks.

BACKGROUND OF THE INVENTION

Call coverage (also sometimes referred to as call forwarding or call redirection from one endpoint to another) is a common feature of many telecommunications switches, particularly private branch exchanges (PBXs). An illustrative implementation of a call coverage feature is described in U.S. Pat. No. 4,436,962. Over time, efforts have been made to extend features across entire networks of routing nodes (e.g., switches) to make features that work with intra-node calls also work with inter-node calls. This is illustrated, for example, in U.S. Pat. No. 4,488,004. The call coverage feature has been a specific focus of some of these efforts, as illustrated by U.S. Pat. Nos. 5,313,459 and 5,369,695, for example.

As normally implemented on a single switch, the call coverage feature typically provides the covered endpoint with a coverage path which consists of a sequence of a plurality of alternative endpoints to which calls may be directed. Hence, if a call cannot be covered to (i.e., cannot be redirected and connected to) a first covering endpoint in the coverage path, the second covering endpoint is tried, and so on, until either coverage to one of the covering endpoints in the coverage path succeeds or all covering endpoints in the coverage path are exhausted. This has been a difficult capability to implement across a network of switches, however. A major reason for this difficulty is that, once a switch connects a call to another switch, it normally loses control of the call to the other switch. Therefore, if a first switch redirects a call for coverage to a covering switch but the covering endpoint served by the covering switch is unable to cover the call, the first switch is not able to regain control of the call and redirect it to the next covering endpoint specified by the applicable coverage path.

The first switch can try to obtain information from the covering switch regarding whether or not the covering endpoint served by the covering switch is available, prior to connecting the covered call thereto. However, this often requires that the switches of the network be interconnected by a separate control network through or from which the switches may obtain control and status information about each other and each other's endpoints. Moreover, even if the need for a separate control network can be avoided, it is virtually unavoidable that the obtained information may be outdated by the time the first switch takes action based thereon. Hence, the first switch may receive an indication from the covering switch that a remote coverage endpoint is available, but by the time it connects the covered call to the covering switch, the remote coverage endpoint may no longer be available. And, since the call has now been connected to the covering switch, the first switch has lost control thereof.

Therefore, what is needed is an arrangement that allows the call coverage feature to work in a network of switches the same way as it works in a single switch.

SUMMARY OF THE INVENTION

This invention is directed to solving the problems and meeting the needs of the art. Generally according to the invention, an arrangement is provided which enables a first switch to redirect a to-be-covered call to a remote covering endpoint served by another switch without losing control over the call. Therefore, if the covering endpoint fails to cover the call, the first switch can redirect the call to the next covering endpoint within the applicable coverage path—just as if the remote covering endpoint had been a local endpoint.

Specifically according to the invention, in response to invocation of call coverage for a call that is connected to a first switch, the first switch connects the call to a second switch that serves a call-covering endpoint of the call, and also the first switch signals the second switch that the call is a coverage call. In response to receiving the signaling, the second switch determines the availability of the call-covering endpoint to receive the call. If the call-covering endpoint is available, the second switch alerts (e.g., rings) the call-covering endpoint of the call, and also signals the first switch that the call-covering endpoint is available. Advantageously, since there is substantially no delay between determining the available status of the endpoint and the undertaking (including alerting) to connect the call to the endpoint, there is no danger of the available status becoming obsolete before the connecting can be undertaken. If the call-covering endpoint is not available, the second switch signals the first switch to that effect. In response to receiving the signaling that the call-covering endpoint is not available, the first switch disconnects the call from the second switch. Advantageously, in this latter case, the call is again merely connected to the first switch as it was prior to commencement of the coverage efforts, the first switch has not lost control of the call to the second switch, and hence the first switch can continue to attempt to cover the call as dictated by the coverage path of the endpoint that was the original destination of the call. The total net effect of the invention is that call coverage works—from a user viewpoint—identically across a network of switches as it does on a single switch.

These and other advantages and features of the invention will become more apparent from the following description of an illustrative embodiment of the invention taken together with the drawing.

DETAILED DESCRIPTION

Figure 1:
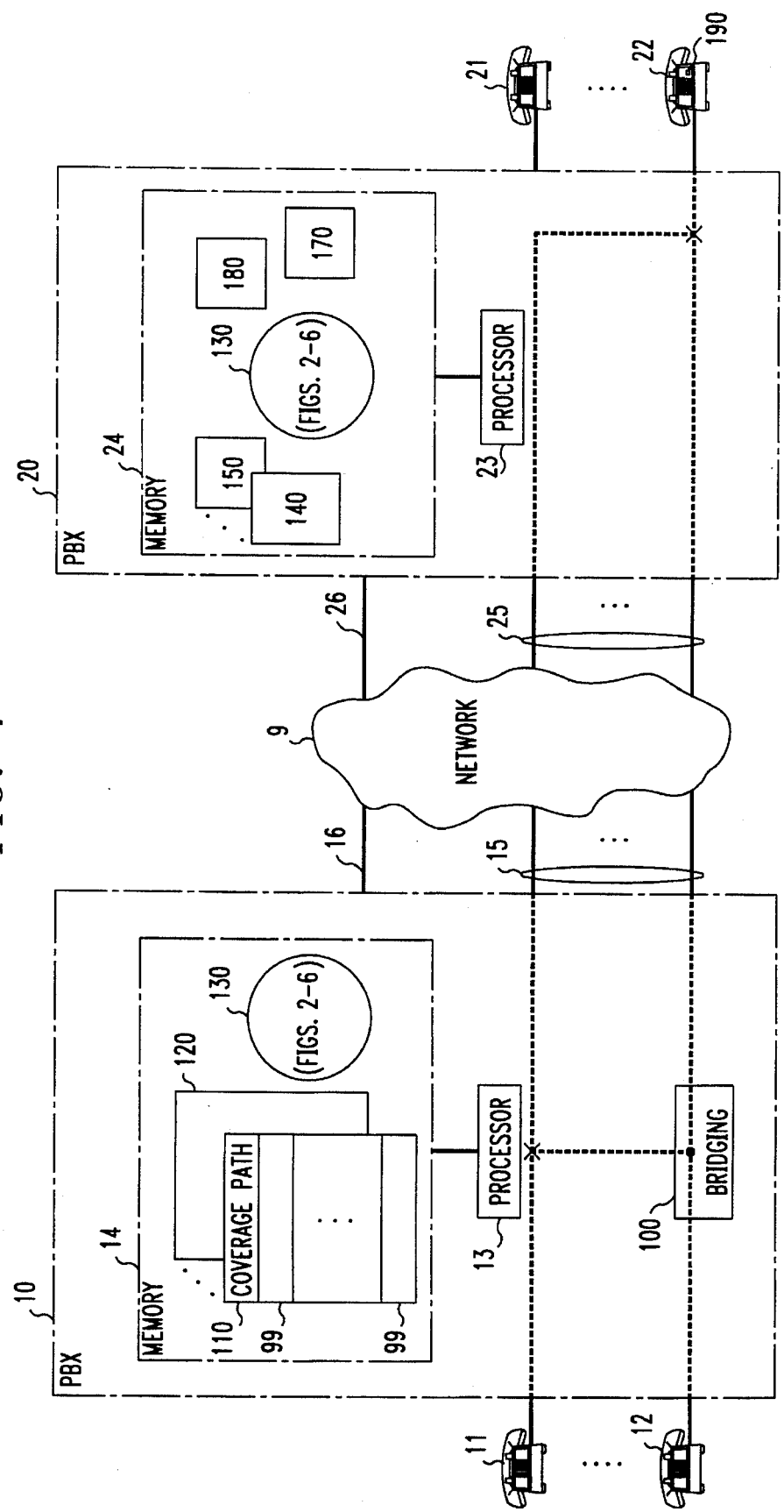
FIG. 1 is a block diagram of an example of a telecommunications network that includes an illustrative embodiment of the invention.

FIG. 1 shows a network of telecommunications switches. The network is illustratively a private telecommunications network made up of private branch exchanges (PBXs) 10 and 20, such as the AT&T Definity® G3 PBXs. However, the network could just as well be a public network made up of central office switches, a hybrid network, a data network, or any other telecommunications network that comprises a plurality of nodes. The illustrative network includes at least two switches (also called switching systems) that are interconnected by a network 9. Network 9 could be a straight-through interconnection between the two switches, or a tandem switch, or a network of a plurality of interconnected switches such as the public telephone network, etc. The form of network 9 is irrelevant for purposes of this invention.

As shown in FIG. 1, each PBX 10 and 20 serves its own complement of communications endpoints, also called terminals, 11–12 and 21–22, respectively. Each PBX 10 and 20 is connected to network 9 by a plurality of user-communications links 15 and 25, and control data signaling links 16 and 26, respectively. Links 15, 16, 25, and 26 may take any form. Examples of possible links 15 and 25 are telephony trunks and ISDN bearer channels. Examples of possible links 16 and 26 are the AT&T DCIU link, a PBX application programmer interface (API) link, a DCS protocol link, or the ISDN D channel. Hence, links 15, 16, 25, and 26 may be either separate physical links or separate channels on the same physical link. Also as shown, PBXs 10 and 20 are illustratively stored-program-controlled entities; each PBX 10, 20 includes a processor 13, 23 which controls the operation of the PBX 10, 20, and a memory 14, 24 which stores control programs and data for use by processor 13, 23.

Included among the control data stored in memory 14, 24 are coverage paths 110–120, 140–150, respectively. Each coverage path is associated with a different terminal 11–12, 21–22. Each coverage path includes a sequence of a plurality of entries 99. Each entry 99 identifies a different endpoint or terminal to which incoming calls destined for the associated endpoint or terminal may be redirected. Included among the control programs stored in each of the memories 14 and 24 are call coverage functions 130. Except for the functions 130, the telecommunications network shown in FIG. 1 is conventional. Hence, only the functions 130 will be described in any detail.

Figure 2:
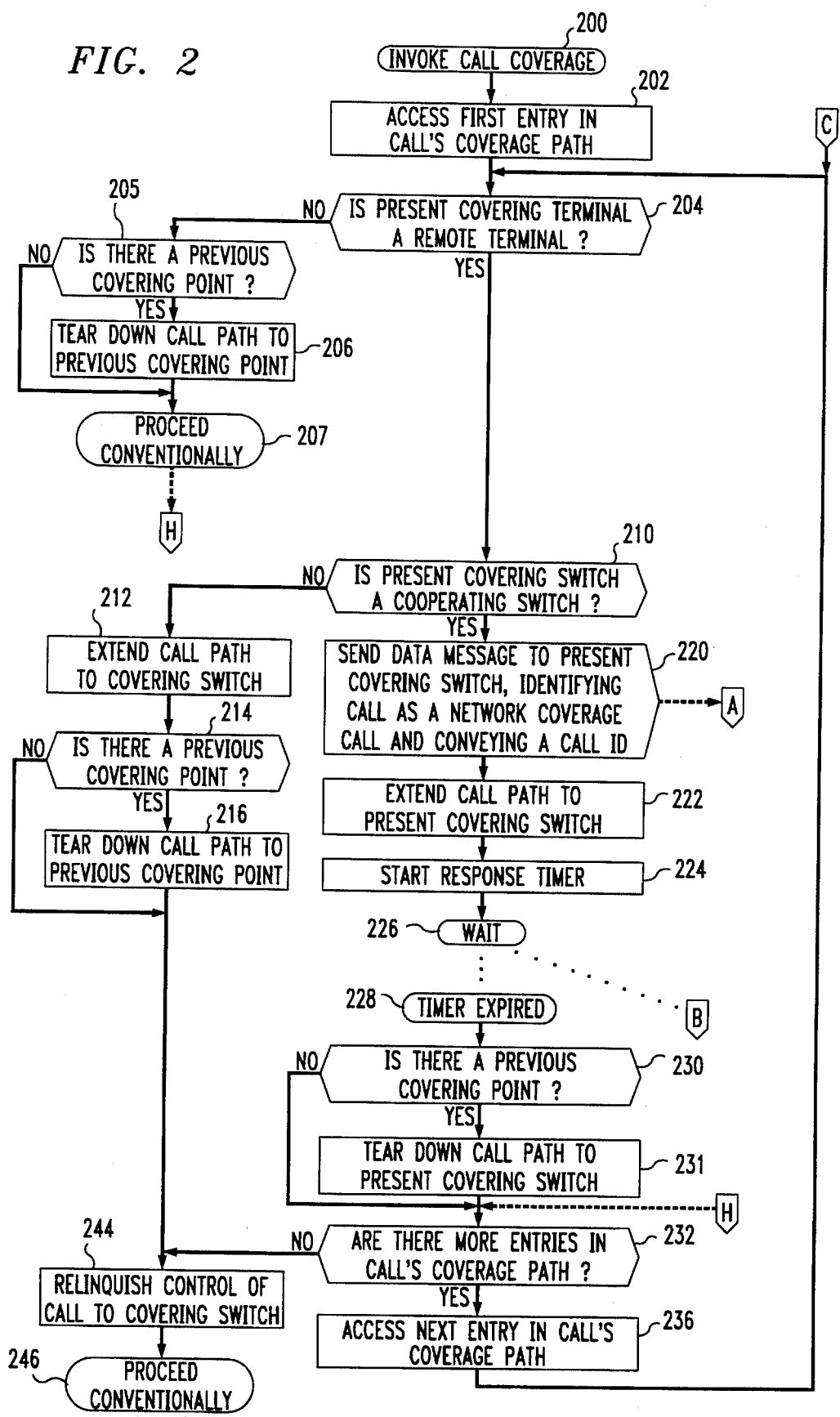
FIGS. 2–3 are a flow diagram of a network call coverage procedure of a PBX of FIG. 1 which is sending a call to coverage.
Figure 3:
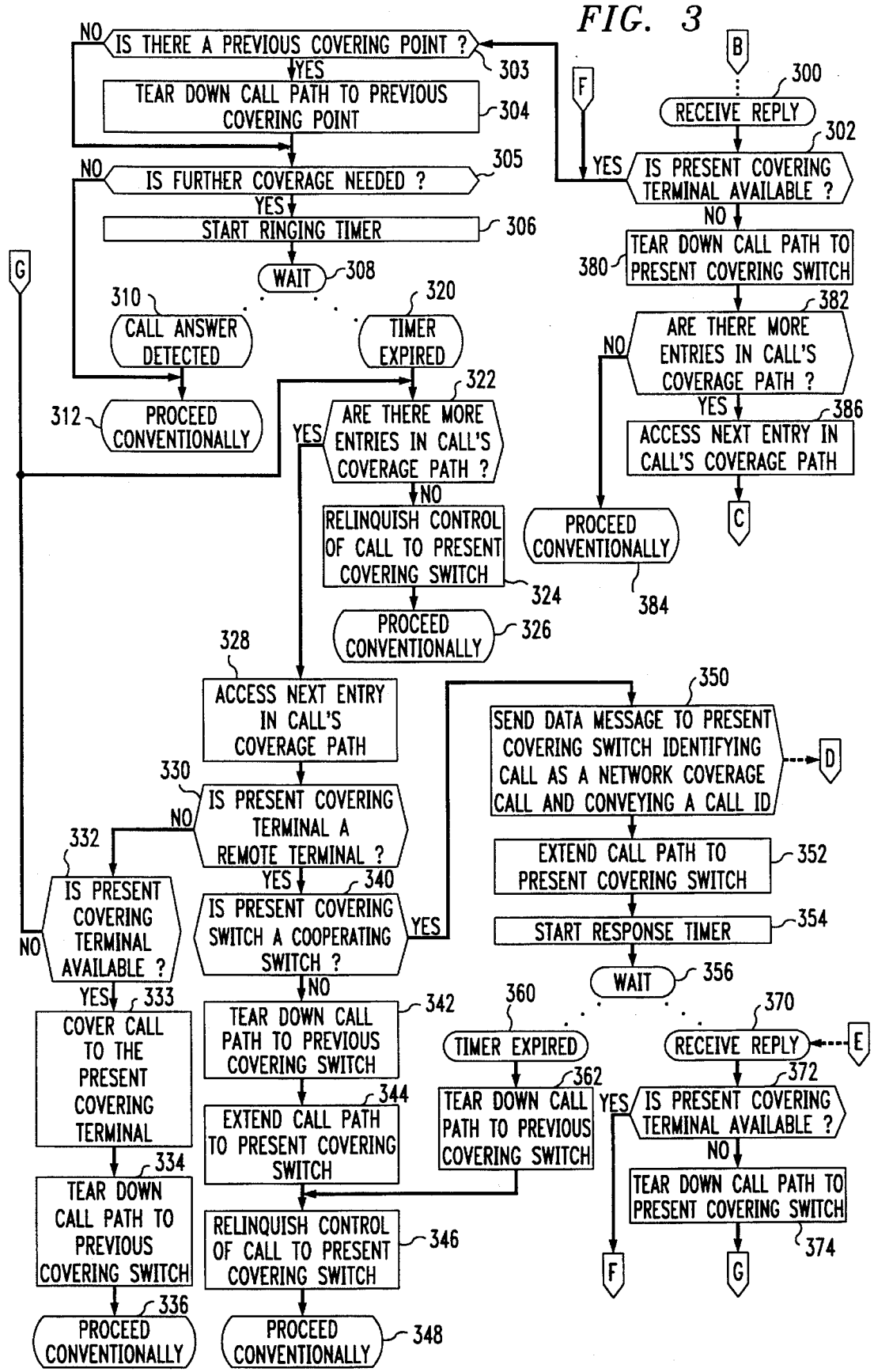
Figure 4:
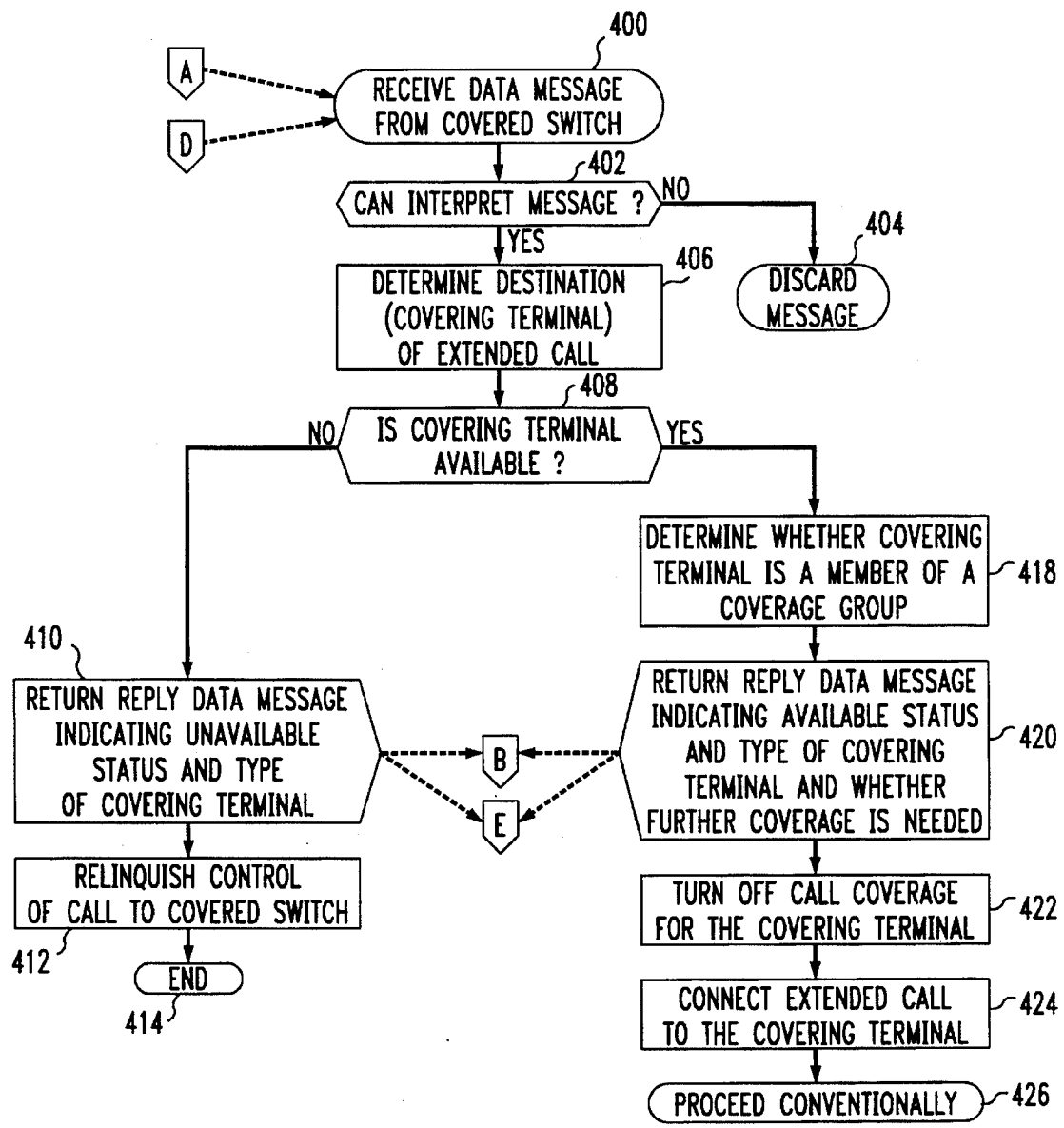
FIG. 4 is a flow diagram of a network call coverage procedure of a PBX of FIG. 1 which is receiving a call for coverage.

The operations carried out by PBXs 10 and 20 under control of functions 130 are diagrammed in FIGS. 2–6. The operations performed by a switch that is sending a call to coverage, referred to herein as the covered switch and illustratively assumed to be PBX 10 in the example of FIG. 1, is shown in FIGS. 2–3, while the operations performed by a switch that is receiving a call for coverage from the covered switch, referred to herein as the covering switch and illustratively assumed to be PBX 20 in the example of FIG. 1, is shown in FIG. 4.

For purposes of illustration, assume that PBX 10 has received an incoming call for terminal 11, the call cannot be completed to or is not answered by terminal 11, and terminal 11 has call coverage activated. In response, call coverage is invoked for the call by covered PBX 10, at step 200 of FIG. 2, in order to determine where this covered call should be redirected to. Since redirection will be dictated by coverage path 110 that is associated with the original call destination—the covered terminal 11—coverage path 110 will henceforth be referred to as the coverage path "of the call". Covered PBX 10 accesses the first entry 99 in that coverage path 110 of the call in order to determine from its contents the—endpoint the covering terminal—to which the call should be redirected, at step 202. Covered PBX 10 determines whether the covering terminal is local or remote, in a conventional manner, at step 204. If the covering terminal is local, i.e., directly served by covered PBX 10, covered PBX 10 checks whether there is a previous covering point for the call, at step 205. Since this is the first attempt at call coverage for this call, the determination at step 205 is negative. However, for all subsequent attempts, the determination will be affirmative, causing covered PBX 10 to tear down any call path that it had set up for the covered call to that previous covering point, at step 206. Following step 205 or 206, covered PBX 10 proceeds to try and redirect the call to the local covering terminal in the conventional manner, at step 207. If the coverage attempt at step 207 should not succeed, covered PBX 10 will proceed to steps 232 et seq.

If covered PBX 10 determines at step 204 that the covering terminal is remote, i.e., served by another switch—PBX 20 in this illustrative example—covered PBX 10 proceeds to determine whether the covering switch is a "cooperating" switch, at step 210. A "cooperating" switch is one that has been configured to effect network call coverage, like PBX 10. Illustratively, covered PBX 10 makes the determination based on whether the covering terminal has a telephone number (decoded extension) that is within the same network numbering plan as is implemented on covered PBX 10: all switches within the network numbering plan are assumed to be "cooperating" switches. Alternatively, each entry 99 may contain an explicit indicator, e.g., a flag, that indicates whether the covering endpoint is served by a "cooperating" switch. Various other alternatives may be envisioned. If covered PBX 10 determines at step 210 that covering PBX 20 is not a "cooperating" switch, it establishes a call connection for the call to covering PBX 20 over trunks 15, 25, and connects the call therethrough to covering PBX 20, at step 212, in a conventional manner. Covered PBX 10 also checks whether there is a previous covering point for the call, at step 214. The answer is negative for the first coverage endpoint in the call's coverage path, and affirmative for all subsequent endpoints. If the answer is affirmative, covered PBX 10 tears down the call path that it had set up for the covered call to that previous covering point, at step 216. Following step 214 or 216, covering PBX 20 conventionally takes over control of the call, causing covered PBX 10 to relinquish control thereover, at step 244. The call is now handled conventionally, like any other inter-PBX call, at step 246.

If covered PBX 10 determines at step 210 that covering PBX 20 is a "cooperating" switch, it sends a data message to covering PBX 20 over control data signaling links 16, 26, which identifies the call as a network coverage call and conveys a call ID for the call, at step 220. At the same time, covered PBX 10 establishes a call connection for the call to covering PBX 20 over trunks 15, 25, and connects the call therethrough to covering PBX 20, at step 222. Covered PBX 10 then starts a response timer, at step 224, and waits for a response from covering PBX 20, at step 226.

If the response timer times out before covered PBX 10 receives a response from covering PBX 20, at step 228, covered PBX 10 checks whether there is a previous covering point for the call, at step 230. If so, covered PBX 10 tears down the call path that it had set up for the covered call at step 222 to the present covering PBX 20, at step 231, and then proceeds to step 232. If there is not a previous covering point for the call, covered PBX 10 proceeds directly to step 232. At step 232, covered PBX 10 checks the call's coverage path 110 to determine if it contains any more entries 99. If the call's coverage path contains no more entries 99, covered PBX 10 relinquishes control of the call to covering PBX 20, at step 244, in the same manner as it would for any inter-PBX call that it has connected to PBX 20. The call is henceforth handled conventionally, as any other inter-PBX call, at step 246. However, if it is determined at step 232 that the call's coverage path does contain more entries 99, covered PBX 10 accesses the next entry 99 in the call's coverage path 110, at step 236, and proceeds to repeat steps 204 et seq. to cover the call to the next covering terminal.

The message which covered PBX 10 sent to covering PBX 20 at step 220 is received by covering PBX 20 at step 400 of FIG. 4. Upon receipt of the message, covering PBX 20 tries to interpret it, at step 402. If it cannot interpret the message, covering PBX 20 merely discards it, at step 404. Since, as a consequence, covering PBX 20 does not know that the call that is being extended by PBX 10 to PBX 20 is a network coverage call, covering PBX 20 will handle the call conventionally, like any other inter-PBX call. However, if covering PBX 20 can interpret the message from covered PBX 10 at step 402, it learns that the extended call is a network coverage call. From the information conventionally provided by covered PBX 10 about the extended call, e.g., via signaling that accompanies the call across trunks 15 and 25, covering PBX 20 determines the destination—the covering terminal—of the extended call, at step 406. Assuming that terminal 22 is specified as the covering terminal, covering PBX 20 then checks in a conventional manner whether the covering terminal 22 is available to receive the call, at step 408. If the covering terminal 22 is not available, covering PBX 20 returns a reply message to covered PBX 10 via control data signaling links 26, 16, indicating the unavailable status and also the endpoint type of covering terminal 22, at step 410. Control of the call is thereby relinquished by covering PBX 20 and is passed back to covered PBX 10, at step 412, and involvement of covering PBX 20 in the call coverage ends, at step 414.

If the covering terminal 22 is found to be available at step 408, covering PBX 20 determines whether the covering terminal 22 is a member of a coverage group, e.g., a hunt group, at step 418. If it is a member of a hunt group, no further coverage is needed for the covered call. Covering PBX 20 then returns a reply message to covered PBX 10 via control data signaling links 26, 16 indicating the available status and the endpoint type of the covering terminal 22, and whether or not further coverage is needed for the covered call, at step 420. Covering PBX 20 also turns off call coverage for the covering terminal 22 on PBX 20, at step 422, in a conventional manner. This ensures that, should the covering terminal 22 fail to answer the call, the call will not be sent to coverage according to the coverage path of the covering terminal 22. Covering PBX 20 then undertakes to connect the covered call to the covering terminal 22, at step 424. This includes ringing the covering terminal 22 to alert it to the presence of the call. The call is henceforth handled conventionally, like any other inter-PBX call, at step 426.

If the reply message which covering PBX 20 sent at step 410 or 420 is received by covered PBX 10 before the response timer expires, at step 300 of FIG. 3, covered PBX 10 checks whether the reply message indicates that the covering terminal is available, at step 302. If the reply message indicates that the covering terminal is not available, covered PBX 10 tears down the call path that it has set up for the call to covering PBX 20 at step 222, at step 380, so as to disconnect the call from the covering PBX 20. Covered PBX 10 then checks whether there are more entries 99 in the call's coverage path 110, at step 382. If not, covered PBX 10 proceeds conventionally as it would proceed if there were no coverage path for the call, at step 384. This normally involves terminating the call. If there are more entries 99 in the call's coverage path, covered PBX 10 accesses the next entry 99, at step 386, and then returns to steps 204 et seq. to cover the call to the next covering terminal.

If the reply message received from covering PBX 20 at step 300 indicates at step 302 that the covering terminal is available, covered PBX 10 checks whether there is a previous covering point for the call, at step 303. If so, covered PBX 10 tears down the call path that it had set up for the covered call to that previous covering point, at step 304. Following step 303 or 304, covered PBX 10 checks the contents of the message that it had received at step 300 to determine whether further coverage is needed for this call, at step 305. If further coverage is not needed, covered PBX 10 proceeds to step 312 to complete the call in a conventional manner like any other inter-PBX call. If further coverage is needed, covered PBX 10 starts a ringing timer, at step 306, and waits, at step 308. The ringing timer limits how long the covering terminal is allowed to keep the covered call unanswered. If, before the ringing timer expires, covered PBX 10 detects, in a conventional manner such as from signaling on trunks 25, 15, that the call has been answered by the covering terminal, at step 310, covered PBX 10 proceeds to complete the call conventionally like any other answered inter-PBX call, at step 312. If, however, the ringing timer expires before call answer is detected, at step 320, covered PBX 10 checks whether there are more entries 99 in the coverage path 110 of the call, at step 322. If there are no more entries 99 in the coverage path 110, covered PBX 10 proceeds to treat the call conventionally like as any other inter-PBX call, at step 326, relinquishing control of the call to covering PBX 20 in the process, at step 324. If covered PBX 10 finds at step 322 that there are more entries 99 in the coverage path 110, it accesses the next entry 99 in the coverage path 110, at step 328, and checks whether the covering terminal designated by that accessed entry 99 is local or remote, at step 330. (This terminal now becomes the new "present" covering terminal in the terminology of the Figures.) If this covering terminal is local, covered PBX 10 checks whether this covering terminal is available to receive the call, at step 332. If the local covering terminal is not available, covered PBX 10 returns to step 322. If the local covering terminal is available, covered PBX 10 covers the call to the local covering terminal at step 333, and then tears down the call path to PBX 20, at step 334, so as to disconnect the call from PBX 20. Covered PBX 10 then handles the call to the local covering terminal conventionally as a local call, at step 336.

Returning to step 330, if PBX 10 determines there that the specified covering terminal is a remote endpoint, it checks at step 340 whether the covering switch that serves this remote covering endpoint is a "cooperating" switch, in the manner described above for step 210 of FIG. 2. (The new covering switch may again be PBX 20.) If the covering switch is determined not to be a "cooperating" switch, covered PBX 10 tears down the call path to the previous covering switch (PBX 20) that it had established at step 222 of FIG. 2, at step 342, so as to disconnect the call from the previous covering switch, and instead extends the call's path to the new covering switch, at step 344, in order to cover the call to the remote covering endpoint. The new covering switch now conventionally takes over control of the call, causing covered PBX 10 to relinquish control thereover, at step 346. The call is now handled conventionally, like any other inter-switch call, at step 348.

If covered PBX 10 determines at step 340 that the new covering switch is a "cooperating" switch, it sends a data message thereto over the control data signaling link 16, which message identifies the call as a network coverage call and conveys a call ID for the call, at step 350. At the same time, covered PBX 10 establishes a call connection for the call to this covering switch over trunk 15, and connects the call therethrough to this covering switch, at step 352. Covered PBX 10 then starts the response timer, at step 354, and waits for a response from this covering switch, at step 356.

The covering switch responds to the message from covered PBX 10 in the manner shown in FIG. 4 and described above in conjunction therewith. If the response timer expires before covered PBX 10 receives a reply message from the covering switch, at step 360, covered PBX 10 tears down the call path that it has set up for the call to the previous covering switch (PBX 20) at step 222, at step 362, in order to disconnect the call from the previous covering switch, and then proceeds to steps 346 et seq. If the reply is received before the response timer expires, at step 370, covered PBX 10 analyzes the reply to determine if the covering terminal is available, at step 372. If the covering terminal is available, covered PBX 10 returns to steps 303 et seq. If the covering terminal is not available, covered PBX 10 tears down the call path that it had set up for the call to the new covering switch at step 352, at step 374, in order to disconnect the call from the new covering switch, and then returns to steps 322 et seq.

Figure 5:
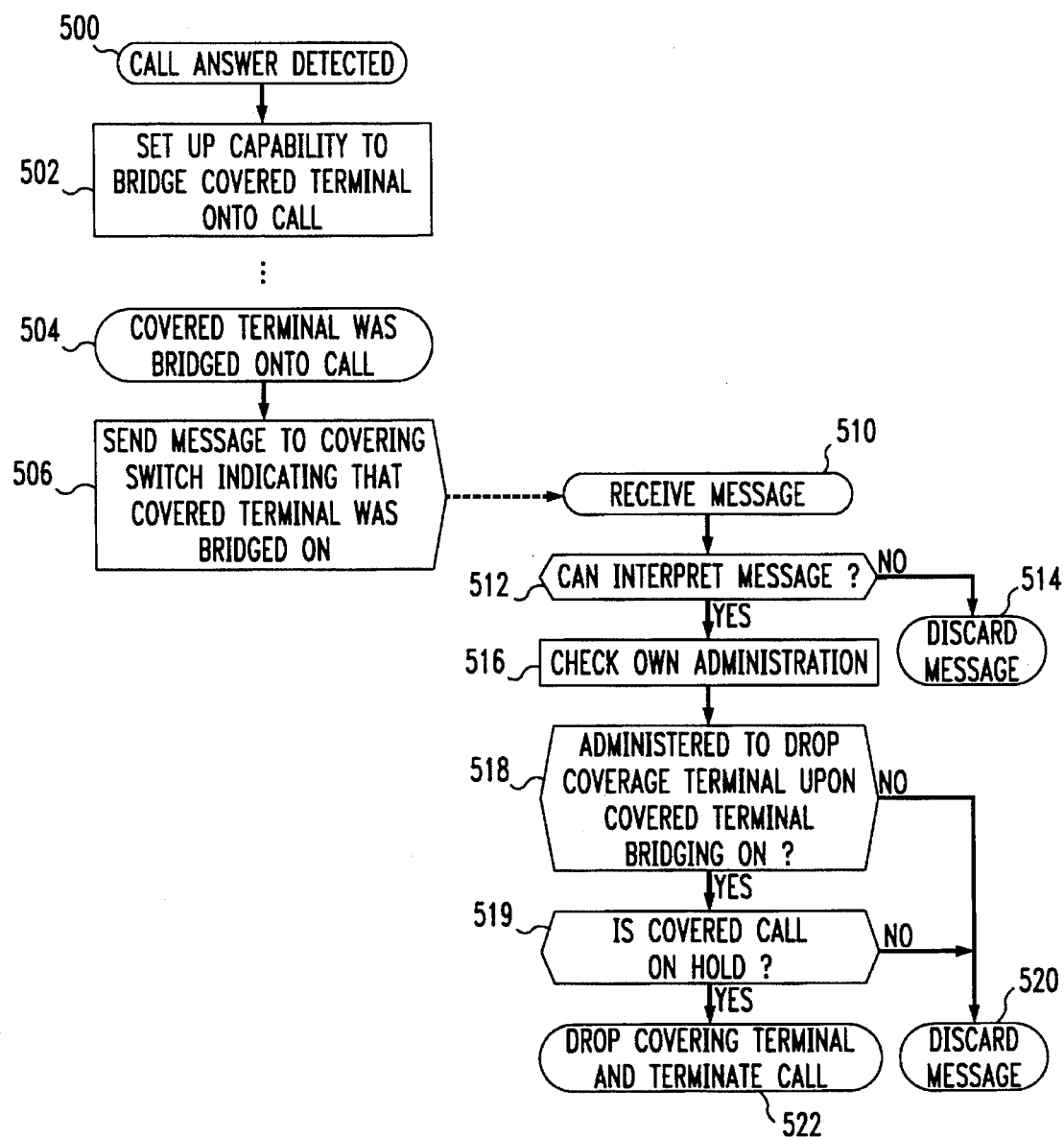
FIG. 5 is a flow diagram of bridging-related procedures of the sending and receiving PBXs of FIG. 1 for a covered network call.

If the call is eventually answered by a covering terminal, whether local or remote, covered PBX 10 detects it, at step 500 of FIG. 5, and in response covered PBX 10 sets up the capability to bridge a call appearance of the original destination terminal 11 onto the call, at step 502, in a conventional manner via a bridging arrangement 100. This is shown in FIG. 1, where terminal 12 is assumed to be the call-originating terminal. If someone then actually bridges terminal 11 onto the covered call by picking up (answering) the call at terminal 11, in the conventional manner by picking up the receiver of terminal 11, at step 504, covered PBX 10 responds by sending a message via control data signaling link 16 to the covering switch—assume PBX 20—that serves the covering terminal—assume terminal 22—that answered the call, at step 506, to inform it that the covered terminal has been bridged onto the call. Covering PBX 20 receives the message, at step 510, and tries to interpret it, at step 512. If covering PBX 20 cannot interpret the message, it discards it, at step 514. If covering PBX 20 can interpret the message, it responds by checking its administration data 170, at step 516, to determine, at step 518, whether it is administered to drop the covering terminal from a covered call when the covered terminal bridges onto the call. If not, it discards the message, at step 520; if so, it checks, at step 519, whether the covered call is on hold at covering terminal 22. If the covered call is not on hold, covering PBX 20 merely discards the message that it received at step 510, at step 520. If the covered call is on hold, covering PBX 20 drops the covering terminal 22 and terminates the call at covering PBX 20, i.e., terminates the portion of the call extending between covered PBX 10 and covering PBX 20, at step 522, in a conventional manner in cooperation with covered PBX 10.

Figure 6:
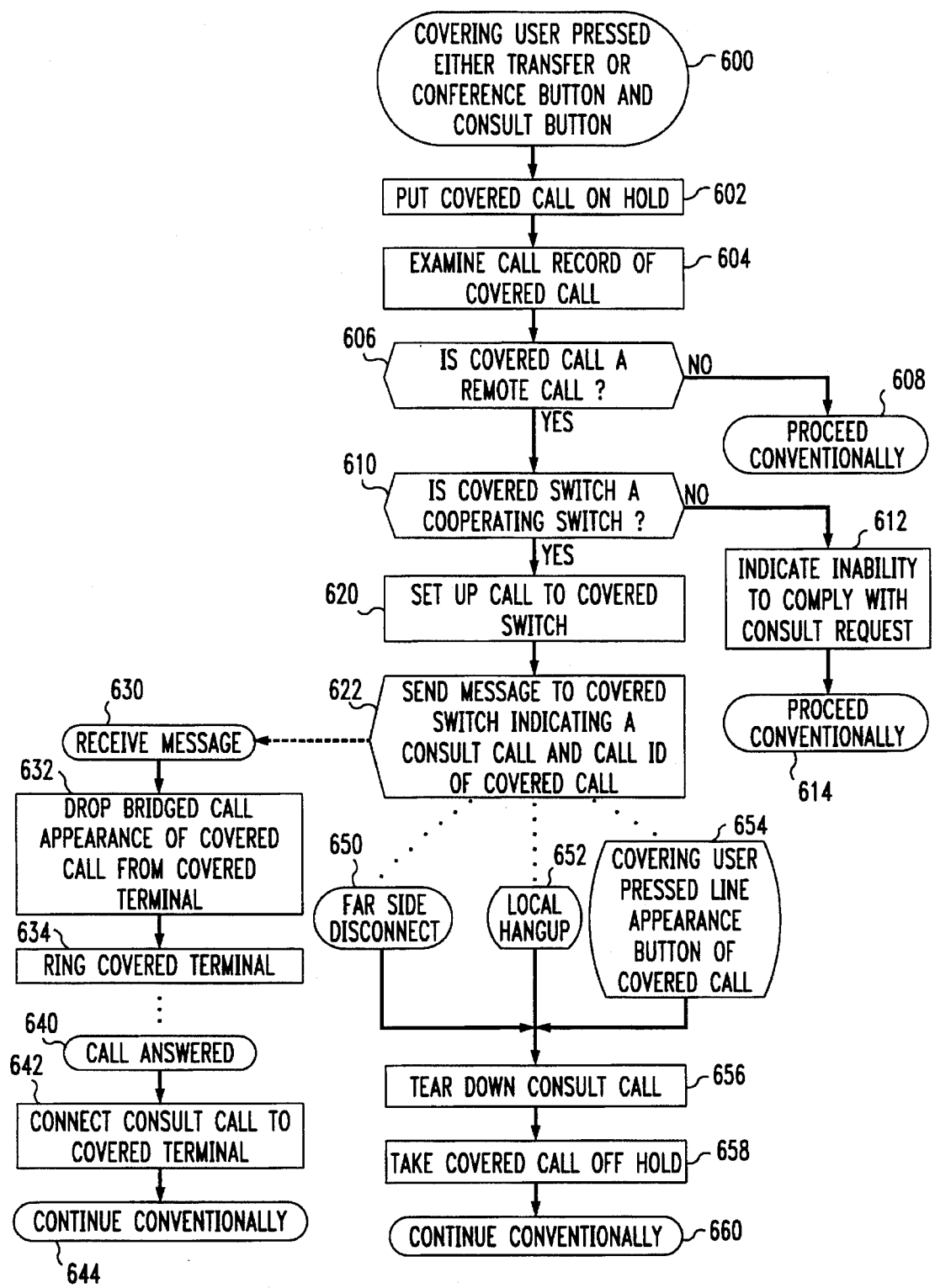
FIG. 6 is a flow diagram of the procedures of the sending and receiving PBXs of FIG. 1 in effecting a CONSULT call for a covered network call.

Some terminals, such as terminal 22 whose principal function is to serve as covering terminals, are each conventionally equipped with a CONSULT button 190. While endpoint terminal 22 is connected to a covered call, pressing of the CONSULT button results in a special priority call being established between terminal 22 and the original destination terminal of the covered call, whereby the party that answered the covered call at terminal 22 can consult about the covered call with the intended recipient of the call and obtain instructions about how to handle the covered call. While the use of the CONSULT button for calls that are covered on the same switch as serves the originate call destination is conventional, according to a further aspect of the invention, the CONSULT capability is also extended to network coverage calls. This is illustrated in FIG. 6.

Assume that the subject covered call has been covered (answered) by a party at covering terminal 22 at covering PBX 20, and that covering PBX 20 is a "cooperating" switch. When the party at covering terminal 22 presses either the TRANSFER button or the CONFERENCE button and also CONSULT button 190, at step 600, covering PBX 20 places the covered call on hold (as a part of the TRANSFER or CONFERENCE function), at step 602, and examines the call record 180 of this call, at step 604, to determine if its origin is local or remote, at step 606. If the call is local, covering PBX 20 processes it in the conventional manner for a CONSULT call, at step 608. If the call is remote, covering PBX 20 examines the call record 180 further to determine if the remote switch is a "cooperating" switch, at step 610. If the call is not indicated to be a cooperating switch, covering PBX 20 indicates to terminal 22 its inability to comply with the CONSULT request, at step 612. Such an indication may be, for example, flashing of a lamp on the terminal's CONSULT button, or an intercept tone, or a recorded message. Covering PBX 20 then continues to handle the covered call conventionally, at step 614.

Returning to step 610, covering PBX 20 knows, from the message about the covered call that it had received from covered PBX 10 at step 400 of FIG. 4, that covered PBX 10 is also a "cooperating" switch, and it knows the call ID of the call. Covering PBX 20 therefore sets up a new call from terminal 22 to covered PBX 10 over trunks 25, 15, at step 620, and at the same time sends a message to covered PBX 10 over control data signal links 26, 16, identifying the new call as a CONSULT call for the covered call whose ID it also includes in the message, at step 622.

Covered PBX 10 receives the message, at step 630 and in response it drops the bridge connection of the covered terminal 11 from the covered call, at step 632 and rings the terminal 11, at step 634. If terminal 11 answers, at step 640, covered PBX 10 connects the CONSULT call to terminal 11, at step 642. Henceforth, covered PBX 10 handles the CONSULT call conventionally, like any other inter-PBX call, at step 644. When terminal 11 or 22 hangs up, at steps 650 or 652, respectively, or when the party at covering terminal 22 presses the line appearance button of the covered call, at step 654, covering PBX 20 tears down the CONSULT call in conventional cooperation with covered PBX 10, at step 656, and reconnects the covered call to terminal 22, at step 658. Covering PBX 20 then proceeds with conventional handling of the covered call, at step 660.

Of course, various changes and modifications to the illustrative embodiment described above will be apparent to those skilled in the art. For example, the covered call can be transferred by the covering party to the covered terminal, or the covering party can conference in the covered terminal and then either remain on the call or drop out. Such changes and modifications can be made without departing from the spirit and the scope of the invention and without diminishing its attendant advantages. It is therefore intended that such changes and modifications be covered by the following claims.

The invention claimed is:

1. A remote call-coverage method comprising the steps of:
in response to invocation of call coverage for a call that is connected to a first switch, connecting the call from the first switch to a second switch that serves a call-covering endpoint of the call, and signaling from the first switch to the second switch that the call is a coverage call;

in response to the second switch receiving the signaling, the second switch determining availability of the call-covering endpoint to receive the call;

in response to the second switch determining that the call-covering endpoint is available, alerting the call-covering endpoint of the call and signaling from the second switch to the first switch that the call-covering endpoint is available;

in response to the second switch determining that the call-covering endpoint is not available, signaling from the second switch to the first switch that the call-covering endpoint is not available; and in response to the first switch receiving the signaling that the call-covering endpoint is not available, disconnecting the call from the second switch.

2. The method of claim 1 wherein the step of connecting and signaling comprises the steps of:

in response to the invocation, identifying the call-covering endpoint from a coverage path of an endpoint that is an original destination of the call; and in response to the call-covering endpoint being an endpoint served by the second switch, connecting the call to the second switch and signaling to the second switch that the call is a coverage call.

3. The method of claim 1 further comprising the steps of:

in response to the first switch not receiving either signaling from the second switch within a predetermined time, determining whether there is an alternative call-covering endpoint for the call;

in response to determining that there is not an alternative call-covering endpoint for the call, the first switch relinquishing control of the call to the second switch; and in response to determining that there is an alternative call-covering endpoint for the call, disconnecting the call from the second switch and attempting to cover the call to the alternative call-covering endpoint.

4. The method of claim 1 further comprising the step of:

in response to the first switch receiving the signaling that the call-covering endpoint is available, completing the call to the call-covering endpoint.

5. The method of claim 1 further comprising the steps of:

in response to (a) the first switch receiving the signaling that the call-covering endpoint is available and (b) the call being answered at the call-covering endpoint within a predetermined time, completing the call to the call-covering endpoint;

in response to (a) the first switch receiving the signaling that the call-covering endpoint is available and (c) the call not being answered at the call-covering endpoint within a predetermined time, determining whether there is an alternative call-covering endpoint for the call;

in response to determining that there is an alternative call-covering endpoint for the call, disconnecting the call from the second switch and attempting to cover the call to the alternative call-covering endpoint; and in response to determining that there is not an alternative call-covering endpoint for the call, relinquishing control of the call to the second switch.

6. The method of claim 1 further comprising the step of:

in response to the first switch receiving the signaling that the call-covering endpoint is not available, covering the call to an alternative call-covering endpoint for the call.

7. The method of claim 1 further comprising the steps of:

in response to the first switch receiving the signaling that the call-covering endpoint is not available, determining whether there is an alternative call-covering endpoint for the call;

in response to determining that there is an alternative call-covering endpoint for the call, attempting to cover the call to the alternative call-covering endpoint; and in response to determining that there is not an alternative call-covering endpoint for the call, ceasing attempts to cover the call.

8. The method of claim 1 further comprising the steps of:

in response to the first switch receiving the signaling that the call-covering endpoint is available, completing the call to the call-covering endpoint;

in response to invocation of a consult feature at the call-covering endpoint, setting up a second call from the second switch to the first switch and signaling from the second switch to the first switch that the second call is a consult call for the covered call; and in response to the first switch receiving the signaling that the second call is a consult call for the covered call, alerting a destination endpoint that was a destination of the covered call.

9. The method of claim 1 further comprising the steps of:

in response to the first switch receiving the signaling that the call-covering endpoint is available, completing the call to the call-covering endpoint; and in response to the completing, bridging a destination endpoint, that was a destination of the call, onto the call.

10. The method of claim 9 further comprising the steps of:

in response to invocation of a consult feature at the call-covering endpoint, placing the covered call on hold at the second switch, setting up a second call from the second switch to the first switch, and signaling from the second switch to the first switch that the second call is a consult call for the covered call; and in response to the first switch receiving the signaling that the second call is a consult call for the covered call, dropping the bridge of the destination endpoint from the covered call and alerting the destination endpoint of the consult call.

11. The method of claim 9 further comprising the step of:

in response to the call being answered at the destination endpoint, signaling from the first switch to the second switch that this call was answered at the destination endpoint.

12. The method of claim 11 further comprising the step of:

in response to the second switch receiving the signaling that the call was answered at the destination endpoint, terminating the call at the second switch.

13. A method of remotely covering a call in a telecommunications network comprising at least two interconnected switches each serving different endpoints, comprising the steps of:

in response to a first switch invoking call coverage for a call connected to the first switch and destined for a destination endpoint served by the first switch, the first switch identifying a call-covering endpoint for the call from a coverage path of the destination endpoint;

in response to the first switch identifying a remote call-covering endpoint for the call from the coverage path, the first switch connecting the call to a second switch that serves the remote call-covering endpoint, and further signaling to the second switch both a call identifier of the call and that the call is a coverage call;

in response to the second switch receiving the signaling, the second switch determining availability of the remote call-covering endpoint to receive the call;

in response to the second switch determining that the remote call-covering endpoint is available, the second switch alerting the remote call-covering endpoint of the call and further signaling to the first switch that the remote call-covering endpoint is available;

in response to the second switch determining that the remote call-covering endpoint is not available, the second switch abstaining from connecting the call to the remote call-covering endpoint and further signaling to the first switch that the remote call-covering endpoint is not available; and in response to the first switch receiving the signaling that the remote call-covering endpoint is not available, the first switch disconnecting the call from the second switch and further identifying an alternative call-covering endpoint for the call.

14. The method of claim 13 further comprising the steps of:

in response to the call being answered at the remote call-covering endpoint that was alerted, completing the call to the remote call-covering endpoint at the second switch to form a covered call, and bridging the destination terminal onto the covered call at the first switch;

in response to invocation of a consult feature at the remote call-covering endpoint that answered the call, placing the covered call on hold at the second switch, setting up a second call from the second switch to the first switch, and signaling from the second switch to the first switch that the second call is a consult call for the covered call;

in response to the first switch receiving the signaling that the second call is a consult call for the covered call, the first switch dropping the bridge of the destination endpoint from the covered call and alerting the destination endpoint of the consult call; and in response to a hanging up of the consult call, reconnecting the held covered call to the remote call-covering endpoint at the second switch.

15. The method of claim 13 further comprising the steps of:

in response to either (a) the first switch not receiving either signaling from the second switch within a predetermined time, or (b) the call not being answered at the alerted remote call-covering endpoint, the first switch determining from the coverage path of the destination endpoint whether there is an alternative call-covering endpoint for the call;

in response to determining that there is not an alternative call-covering endpoint for the call, the first switch relinquishing control of the call to the second switch; and in response to determining that there is an alternative call-covering endpoint for the call, the first switch disconnecting the call from the second switch and attempting to cover the call to the alternative call-covering endpoint.

16. The method of claim 15 further comprising the steps of:

in response to the first switch receiving the signaling that the remote call-covering endpoint is not available, the first switch determining from the coverage path of the destination endpoint whether there is an alternative call-covering endpoint for the call;

in response to determining that there is an alternative call-covering endpoint for the call, the first switch disconnecting the call from the second switch and attempting to cover the call to the alternative call-covering endpoint; and in response to both (a) receiving the signaling that the remote call-covering endpoint is not available and (b) determining that there is no alternative call-covering endpoint for the call, ceasing attempts to cover the call.

17. A first switch adapted to effect remote call coverage, comprising:

means responsive to invocation of call coverage for a first call that is connected to the switch, for connecting the first call from the first switch to a second switch that serves a call-covering endpoint of the first call;

means responsive to the invocation, for signaling from the first switch to the second switch that the first call is a coverage call, to cause the second switch to determine availability of the call-covering endpoint to receive the first call and signal the determined availability back to the first switch;

means responsive to receipt of signaling from the second switch that the call-covering endpoint is available, for awaiting connection of the first call by the second switch to the call-covering endpoint; and means responsive to receipt of signaling from the second switch that the call-covering endpoint is not available, for disconnecting the first call from the second switch.

18. The first switch of claim 17 wherein:

the connecting means comprise means responsive to the invocation, for identifying the call-covering endpoint from a coverage path of an endpoint that is an original destination of the first call, and means responsive to the identified call-covering endpoint being an endpoint served by the second switch, for connecting the first call to the second switch; and the signaling means comprise means responsive to the identified call-covering endpoint being an endpoint served by the second switch, for signaling from the first switch to the second switch that the first call is a coverage call.

19. The first switch of claim 17 further comprising:

means responsive to lack of receipt of either signaling from the second switch within a predetermined time, for determining whether there is an alternative call-covering endpoint for the first call;

means responsive to a determination that there is not an alternative call-covering endpoint for the first call, for causing the first switch to relinquish control of the first call to the second switch;

means responsive to a determination that there is an alternative call-covering endpoint for the first call, for disconnecting the first call from the second switch; and means responsive to the determination that there is an alternative call-covering endpoint for the first call, for attempting to cover the first call to the alternative call-covering endpoint.

20. The first switch of claim 17 further comprising:

means responsive to (a) receipt of the signaling that the call-covering endpoint is available and (b) the first call being answered at the call-covering endpoint within a predetermined time, for completing the first call to the call-covering endpoint;

means responsive to (a) receipt of the signaling that the call-covering endpoint is available and (c) the first call not being answered at the call-covering endpoint within a predetermined time, for determining whether there is an alternative call-covering endpoint for the first call;

means responsive to a determination that there is an alternative call-covering endpoint for the first call, for disconnecting the first call from the second switch;

means responsive to the determination that there is an alternative call-covering endpoint for the first call, for attempting to cover the first call to the alternative call-covering endpoint; and means responsive to a determination that there is not an alternative call-covering endpoint for the first call, for causing the first switch to relinquish control of the call to the second switch.

21. The first switch of claim 17 further comprising:

means responsive to receipt of the signaling that the call-covering endpoint is not available, for causing the first switch to cover the call to an alternative call-covering endpoint for the first call.

22. The first switch of claim 17 further comprising:

means responsive to receipt of the signaling that the call-covering endpoint is not available, for determining whether there is an alternative call-covering endpoint for the first call;

means responsive to a determination that there is an alternative call-covering endpoint for the first call, for attempting to cover the first call to the alternative call-covering endpoint; and means responsive to a determination that there is not an alternative call-covering endpoint for the first call, for causing the first switch to cease attempts to cover the first call.

23. The first switch of claim 17 further comprising:

means responsive to receipt of signaling from the second switch that a second call that is connected from the second switch to the first switch is a coverage call, for determining availability to receive the second call of a call-covering endpoint of the second call that is served by the first switch;

means responsive to the determination that the call-covering endpoint of the second call is available, for alerting the call-covering endpoint of the second call to connect the second call to the call-covering endpoint of the second call;

means responsive to the determination that the call-covering endpoint of the second call is available, for signaling to the second switch that the call-covering endpoint of the second call is available; and means responsive to a determination that the call-covering endpoint of the second call is not available, for signaling to the second switch that the call-covering endpoint of the second call is not available.

24. The first switch of claim 23 further comprising:

means responsive to the second call being answered at the call-covering endpoint of the second call, for connecting the second call to the call-covering endpoint of the second call;

means responsive to invocation of a consult feature at the call-covering endpoint of the second call, for setting up a third call from the first switch to the second switch;

means responsive to the invocation of the consult feature at the call-covering endpoint of the second call, for signaling to the second switch that the third call is a consult call for the second call; and means responsive to receipt of the signaling from the second switch that a fourth call that is connected from the second switch to the first switch is a consult call for the first call, for alerting the destination endpoint of the first call to connect the fourth call to the destination endpoint of the first call.

25. The first switch of claim 17 further comprising:

means responsive to receipt of the signaling that the call-covering endpoint is available, for completing the first call to the call-covering endpoint; and means responsive to the completing, for bridging a destination endpoint, that was a destination of the first call, onto the first call.

26. The first switch of claim 25 further comprising:

means responsive to receipt of signaling from the second switch that a second call that is connected from the second switch to the first switch is a coverage call, for determining availability to receive the second call of a call-covering endpoint of the second call that is served by the first switch;

means responsive to a determination that the call-covering endpoint of the second call is available, for connecting the second call to the call-covering endpoint of the second call;

means responsive to the determination that the call-covering endpoint of the second call is available, for signaling to the second switch that the call-covering endpoint of the second call is available, to cause the second switch to bridge a destination endpoint, that was a destination of the second call, onto the second call;

means responsive to invocation of a consult feature at the call-covering endpoint of the second call, for placing the second call on hold and setting up a third call from the first switch to the second switch; and means responsive to the invocation of the consult feature, for signaling from the first switch to the second switch that the third call is a consult call for the second call, to cause the second switch to drop the bridge of the destination endpoint of the second call from the second call and connect the destination endpoint of the second call to the third call.

27. The first switch of claim 25 further comprising:

means responsive to receipt of the signaling from the second switch that a second call that is connected from the second switch to the first switch is a consult call for the first call, for dropping the bridge of the destination endpoint from the first call and alerting the destination endpoint of the consult call.

28. The first switch of claim 25 further comprising:

means responsive to the first call being answered at the destination endpoint, for signaling to the second switch that the first call was answered at the destination endpoint.

29. The first switch of claim 28 further comprising:

means responsive to receipt of signaling from the second switch that a second call that is connected from the second switch to the first switch is a coverage call, for determining availability to receive the second call of a call-covering endpoint of the second call that is served by the first switch;

means responsive to a determination that the call-covering endpoint of the second call is available, for connecting the second call to the call-covering endpoint of the second call;

means responsive to the determination that the call-covering endpoint of the second call is available, for signaling to the second switch that the call-covering endpoint of the second call is available, to cause the second switch to bridge a destination endpoint, that was a destination of the second call, onto the second call; and means responsive to receipt of signaling from the second switch that the second call was answered at the bridged destination endpoint of the second call, for terminating the second call at the first switch.

30. A first switch adapted for remotely covering a call in a telecommunications network comprising at least two interconnected switches each serving different endpoints, comprising:

means responsive to invocation of call coverage for a first call connected to the first switch and destined for a destination endpoint served by the first switch, for identifying a call-covering endpoint for the first call from a coverage path of the destination endpoint;

means responsive to identification of a remote call-covering endpoint for the first call from the coverage path, for connecting the first call to a second switch that serves the remote call-covering endpoint;

means responsive to the identification, for signaling to the second switch both a call identifier of the first call and that the first call is a coverage call, to cause the second switch to determine and signal back an availability of the remote call-covering endpoint to receive the first call;

means responsive to receipt of signaling from the second switch that a second call that is connected from the second switch to the first switch is a coverage call, for determining availability to receive the second call of a call-covering endpoint of the second call that is served by the first switch;

means responsive to a determination that the call-covering endpoint of the second call is available, for alerting the call-covering endpoint of the second call to connect the second call to the call-covering endpoint of the second call;

means responsive to the determination that the call-covering endpoint of the second call is available, for signaling to the second switch that the call-covering endpoint of the second call is available;

means responsive to a determination that the call-covering endpoint of the second call is not available, for signaling to the second switch that the call-covering endpoint of the second call is not available, without attempting to connect the second call to the call-covering endpoint of the second call;

means responsive to receipt of signaling from the second switch that the remote call-covering endpoint is available, for awaiting connection of the first call by the second switch to the remote call-covering endpoint; and means responsive to receipt of signaling from the second switch that the remote call-covering endpoint is not available, for disconnecting the first call from the second switch and further identifying an alternative call-covering endpoint for the call.

31. The first switch of claim 30 further comprising:

means responsive to the second call being answered at the call-covering endpoint of the second call that was alerted, for connecting the second call to the call-covering endpoint of the second call;

means responsive to the first call being answered at the remote call-covering endpoint, for bridging the destination endpoint onto the first call;

means response to invocation of a consult feature at the call-covering endpoint of the second call, for placing the second call on hold;

means responsive to the invocation of the consult feature at the remote call-covering endpoint of the second call, for setting up a third call from the first switch to the second switch;

means responsive to the invocation of the consult feature at the remote call-covering endpoint of the second call, for signaling to the second switch that the third call is a consult call for the second call;

means responsive to receipt of the signaling from the second switch that a fourth call that is connected from the second switch to the first switch is a consult call for the first call, for dropping the bridge of the destination endpoint from the first call;

means responsive to the receipt of the signaling from the second switch that the fourth call is a consult call for the first call, for alerting the destination endpoint of the first call; and means responsive to a hanging up of the third call, for reconnecting the held second call to the call-covering endpoint of the second call.

32. The first switch of claim 30 further comprising:

means responsive to either (a) a lack of receipt of either signaling from the second switch within a predetermined time, or (b) the first call not being answered at the alerted remote call-covering endpoint, for determining from the coverage path of the destination endpoint whether there is an alternative call-covering endpoint for the first call;

means responsive to a determination that there is not an alternative call-covering endpoint for the first call, for causing the first switch to relinquish control of the first call to the second switch; and means responsive to a determination that there is an alternative call-covering endpoint for the first call, for causing the first switch to disconnect the call from the second switch and attempting to cover the first call to the alternative call-covering endpoint.

33. The first switch of claim 32 further comprising:

means responsive to receipt of the signaling that the remote call-covering endpoint is not available, for determining from the coverage path of the destination endpoint whether there is an alternative call-covering endpoint for the first call;

means responsive to a determination that there is an alternative call-covering endpoint for the first call, for causing the first switch to disconnect the first call from the second switch and attempt to cover the first call to the alternative call-covering endpoint; and means responsive to both (a) receipt of the signaling that the remote call-covering endpoint is not available and (b) a determination that there is no alternative call-covering endpoint for the first call, for causing the first switch to cease attempts to cover the first call.

* * * * *